US010595237B2

United States Patent
Ji et al.

(10) Patent No.: US 10,595,237 B2
(45) Date of Patent: *Mar. 17, 2020

(54) CARRIER AGGREGATION ACROSS DIFFERENT RADIO ACCESS TECHNOLOGIES

(71) Applicant: QUALCOMM Incorporated, San Diego, CA (US)

(72) Inventors: Tingfang Ji, San Diego, CA (US); John Edward Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,495

(22) Filed: Jul. 13, 2018

(65) Prior Publication Data

US 2018/0324649 A1    Nov. 8, 2018

Related U.S. Application Data

(63) Continuation of application No. 15/068,374, filed on Mar. 11, 2016, now Pat. No. 10,028,176.

(Continued)

(51) Int. Cl.
*H04W 36/00*    (2009.01)
*H04L 5/00*    (2006.01)
(Continued)

(52) U.S. Cl.
CPC ....... *H04W 36/0022* (2013.01); *H04L 1/1829* (2013.01); *H04L 1/1867* (2013.01);
(Continued)

(58) Field of Classification Search
None
See application file for complete search history.

(56) References Cited

U.S. PATENT DOCUMENTS 8,483,156 B2    7/2013    Toskala et al.
8,837,358 B2    9/2014    Lunttila et al.
(Continued)

FOREIGN PATENT DOCUMENTS

EP    2673972 A2    12/2013
JP    2013046418 A    3/2013
(Continued)

OTHER PUBLICATIONS

International Search Report and Written Opinion—PCT/US2016/022346—ISA/EPO—dated Jun. 15, 2016.

*Primary Examiner* — Ayaz R Sheikh
*Assistant Examiner* — Tarell A Hampton
(74) *Attorney, Agent, or Firm* — Haynes and Boone, LLP

(57) ABSTRACT

Systems, methods, apparatuses, and computer-program products for performing carrier aggregation across different radio access technologies are disclosed. For example, in some instances a method of wireless communication includes transmitting, using a first wireless communication device, control information to a second wireless communication device via a first radio access technology (RAT), the control information including control information for a second RAT; and receiving, at the first wireless communication device, an acknowledgement (ACK) or negative acknowledgement (NACK) from the second wireless communication device via the first RAT, the ACK or NACK being related to communications of the second wireless communication device conducted via the second RAT.

27 Claims, 9 Drawing Sheets

Related U.S. Application Data

(60) Provisional application No. 62/133,367, filed on Mar. 14, 2015.

(51) Int. Cl.

| | | |
|---|---|---|
| *H04W 76/16* | (2018.01) |
| *H04L 1/18* | (2006.01) |
| *H04W 72/12* | (2009.01) |
| *H04W 88/06* | (2009.01) |
| *H04W 88/10* | (2009.01) |

(52) U.S. Cl.
CPC ............ *H04L 5/001* (2013.01); *H04L 5/0053* (2013.01); *H04L 5/0055* (2013.01); *H04W 72/1215* (2013.01); *H04W 76/16* (2018.02); *H04W 88/06* (2013.01); *H04W 88/10* (2013.01)

(56) References Cited

U.S. PATENT DOCUMENTS

| | | | |
|---|---|---|---|
| 9,648,573 B2 | 5/2017 | Siomina et al. | |
| 2008/0037484 A1* | 2/2008 | Sugiura | H04W 28/14 370/338 |
| 2010/0232345 A1 | 9/2010 | Tsai et al. | |
| 2010/0234071 A1 | 9/2010 | Shabtay et al. | |
| 2010/0265842 A1 | 10/2010 | Khandekar et al. | |
| 2010/0331030 A1 | 12/2010 | Nory et al. | |
| 2011/0134831 A1 | 6/2011 | Pirskanen | |
| 2011/0194500 A1 | 8/2011 | Kim et al. | |
| 2011/0269453 A1 | 11/2011 | Ranta-Aho et al. | |
| 2011/0275359 A1 | 11/2011 | Sebire et al. | |
| 2011/0305193 A1 | 12/2011 | Grant et al. | |
| 2012/0120821 A1 | 5/2012 | Kazmi et al. | |
| 2012/0140743 A1 | 6/2012 | Pelletier et al. | |
| 2012/0147772 A1 | 6/2012 | Kazmi et al. | |
| 2012/0230268 A1 | 9/2012 | Marinier et al. | |
| 2013/0028117 A1 | 1/2013 | Montojo et al. | |
| 2013/0039342 A1 | 2/2013 | Kazmi et al. | |
| 2013/0070653 A1 | 3/2013 | Banister et al. | |
| 2013/0083661 A1 | 4/2013 | Gupta et al. | |
| 2013/0201892 A1 | 8/2013 | Holma et al. | |
| 2013/0230022 A1 | 9/2013 | Guo et al. | |
| 2013/0322395 A1 | 12/2013 | Kazmi et al. | |
| 2013/0329583 A1 | 12/2013 | Vrzic et al. | |
| 2013/0329694 A1 | 12/2013 | Vrzic et al. | |
| 2014/0036853 A1 | 2/2014 | Kim et al. | |
| 2014/0119224 A1 | 5/2014 | Keskitalo et al. | |
| 2014/0192664 A1 | 7/2014 | Ericson et al. | |
| 2014/0341053 A1 | 11/2014 | Bhushan et al. | |
| 2014/0370882 A1 | 12/2014 | Liu et al. | |
| 2016/0269943 A1 | 9/2016 | Ji et al. | |
| 2017/0280447 A1 | 9/2017 | Uchino et al. | |
| 2018/0020462 A1* | 1/2018 | Xiong | H04W 72/1215 |

FOREIGN PATENT DOCUMENTS

| | | |
|---|---|---|
| JP | 2014508468 A | 4/2014 |
| WO | WO-2012109195 A2 | 8/2012 |
| WO | 2012177938 A1 | 12/2012 |
| WO | WO-2014189912 A1 | 11/2014 |
| WO | WO-2016133107 A1 | 8/2016 |

* cited by examiner

CARRIER AGGREGATION ACROSS DIFFERENT RADIO ACCESS TECHNOLOGIES

CROSS REFERENCE TO RELATED APPLICATIONS

The present application is a continuation application of U.S. Non-Provisional patent application Ser. No. 15/068,374, filed Mar. 11, 2016, which claims priority to and the benefit of the U.S. Provisional Patent Application No. 62/133,367, filed Mar. 14, 2015, the disclosure of each of which is hereby incorporated by reference in its entirety.

TECHNICAL FIELD

This application relates to wireless communication systems, and more particularly to carrier aggregation across different radio access technologies.

INTRODUCTION

The demand for wireless data services continues to increase exponentially. As the demand for data grows, techniques capable of delivering higher data rates to mobile devices continue to be of interest. One way to deliver higher data rates is to increase the spectral bandwidth available to wireless communication systems.

Reflecting the trend to use increasing bandwidth, current versions of 3rd Generation Partnership Project (3GPP) Long Term Evolution (LTE) networks have up to 100 megahertz (MHz) available for communication. Moreover, it is possible that future networks, such as fifth generation (or 5G) networks, may utilize several hundred MHz or more in an attempt meet future demand for data services. Further, carrier aggregation can be used to increase downlink and uplink throughput. In carrier aggregation, multiple carriers can be aggregated on the physical layer to provide increased bandwidth (and thus increased throughput).

Another approach to delivering higher data rates is dual connectivity. In dual connectivity, multiple base stations or eNodeBs are utilized to deliver/receive data to/from a user. With dual connectivity, each base station establishes independent downlink/uplink control and data channels. Also, a bearer and/or a packet data convergence protocol (PDCP) may be split across the multiple base stations.

Also, wireless communication systems can utilize multiple different radio access technologies (RATs) to provide data communication to users. For example, various combinations of LTE, LTE-Advanced (LTE-A), LTE unlicensed (LTE-U), Universal Terrestrial Radio Access (UTRA), cdma2000, Global System for Mobile Communications (GSM), Evolved UTRA (E-UTRA), Ultra Mobile Broadband (UMB), IEEE 802.11 (Wi-Fi), IEEE 802.16 (WiMAX), IEEE 802.20, Flash-OFDMA, 802.15.1 (Bluetooth), 802.15.4 (ZigBee), and other RATs currently being developed or that will be developed in the future may be utilized in an effort to increase data rates. However, similar to dual connectivity, each different RAT can require independent downlink/uplink control and data channels.

Accordingly, there remains a need for techniques to facilitate carrier aggregation across different RATs without requiring independent control and data channels for each RAT.

SUMMARY

In one aspect of the disclosure, a method of wireless communication is provided that includes transmitting, using a first wireless communication device, control information to a second wireless communication device via a first radio access technology (RAT), the control information including control information for the first RAT and a second RAT, a timing structure of the second RAT being aligned to a timing structure of the first RAT; and receiving, at the first wireless communication device, an acknowledgement (ACK) or negative acknowledgement (NACK) from the second wireless communication device via the first RAT, the ACK or NACK being related to communications of the second wireless communication device conducted via the second RAT.

In an additional aspect of the disclosure, a method of wireless communication is provided that includes receiving, at a first wireless communication device, control information from a second wireless communication device via a first radio access technology (RAT), the control information including control information for the first RAT and a second RAT, a timing structure of the second RAT being aligned to a timing structure of the first RAT; and transmitting, using the first wireless communication device, first data to the second wireless communication device via the second RAT.

In an additional aspect of the disclosure, a wireless communication device is provided that includes a multiple radio access technology (multi-RAT) module configured to generate control information; a transmitter in communication with the multi-RAT module and configured to transmit the generated control information to a second wireless communication device via a first radio access technology (RAT), the transmitted control information including control information for the first RAT and a second RAT, a timing structure of the second RAT being aligned to a timing structure of the first RAT; and a receiver in communication with the multi-RAT module and configured to receive an acknowledgement (ACK) or negative acknowledgement (NACK) from the second wireless communication device via the first RAT, the ACK or NACK being related to communications of the second wireless communication device conducted via the second RAT.

In an additional aspect of the disclosure, a wireless communication device is provided that includes a receiver configured to receive control information from a second wireless communication device via a first radio access technology (RAT), the control information including control information for the first RAT and a second RAT, a timing structure of the second RAT being aligned to a timing structure of the first RAT; and a transmitter configured to transmit first data to the second wireless communication device via the second RAT.

In an additional aspect of the disclosure, a wireless communication device is provided that includes means for transmitting control information to a second wireless communication device via a first radio access technology (RAT), the control information including control information for the first RAT and a second RAT, a timing structure of the second RAT being aligned to a timing structure of the first RAT; and means for receiving an acknowledgement (ACK) or negative acknowledgement (NACK) from the second wireless communication device via the first RAT, the ACK or NACK being related to communications of the second wireless communication device conducted via the second RAT.

In an additional aspect of the disclosure, a wireless communication device is provided that includes means for receiving control information from a second wireless communication device via a first radio access technology (RAT), the control information including control information for the first RAT and a second RAT, a timing structure of the second RAT being aligned to a timing structure of the first RAT; and means for transmitting first data to the second wireless communication device via the second RAT.

In an additional aspect of the disclosure, a computer readable medium having program code recorded thereon is provided that includes code for causing a computer, at a first wireless communication device, to transmit control information to a second wireless communication device via a first radio access technology (RAT), the control information including control information for the first RAT and a second RAT, a timing structure of the second RAT being aligned to a timing structure of the first RAT; and code for causing the computer to receive an acknowledgement (ACK) or negative acknowledgement (NACK) from the second wireless communication device via the first RAT, the ACK or NACK being related to communications of the second wireless communication device conducted via the second RAT.

In an additional aspect of the disclosure, a computer readable medium having program code recorded thereon is provided that includes code for causing a computer, at a first wireless communication device, to receive control information from a second wireless communication device via a first radio access technology (RAT), the control information including control information for the first RAT and a second RAT, a timing structure of the second RAT being aligned to a timing structure of the first RAT; and code for causing the computer to transmit first data to the second wireless communication device via the second RAT.

Additional aspects, features, and advantages of the present disclosure will become apparent from the following detailed description.

DETAILED DESCRIPTION

Figure 1:
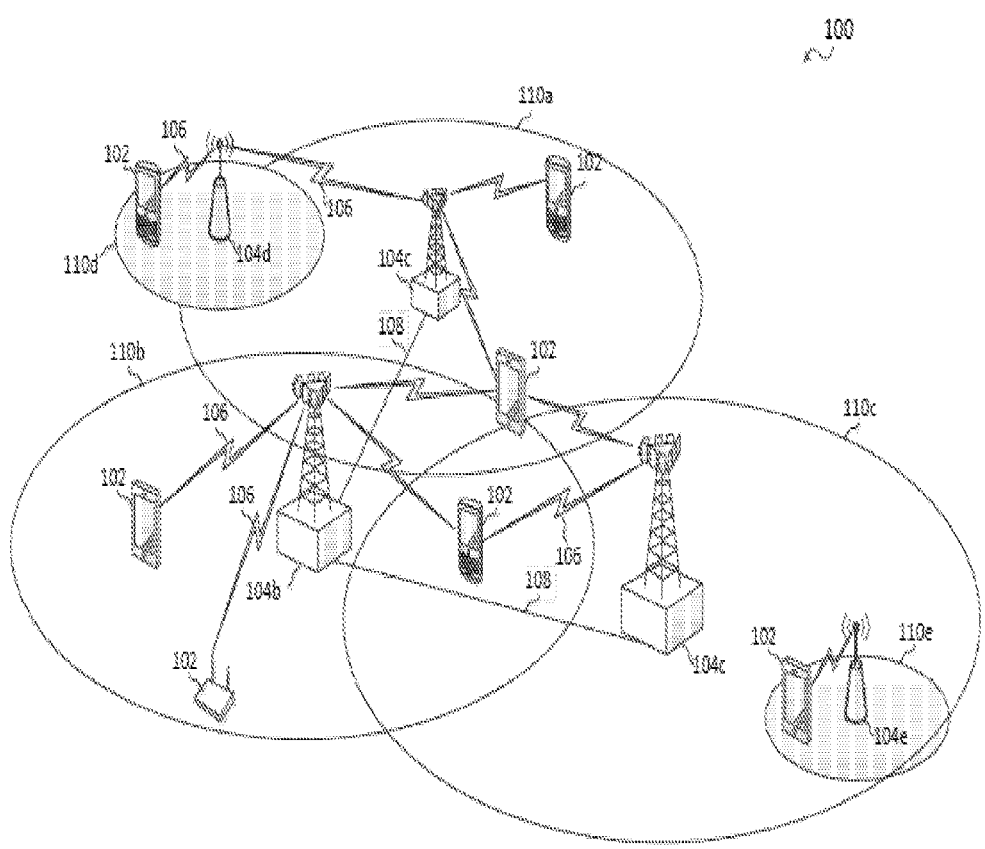
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks, including the various radio access technologies (RATs), including existing and future developed RATs, associated with each. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Aspects of the present disclosure facilitate carrier aggregation across multiple RATs using a single RAT for control signaling, scheduling, ACK/NACK, etc. In some implementations downlink, multi-RAT carrier aggregation and/or uplink, multi-RAT carrier aggregation can be performed on a subframe and/or slot level. For example, in the context of an LTE system where an additional non-LTE RAT has been incorporated into the system, the LTE downlink and/or uplink control channels can be utilized to schedule and/or acknowledge (or not) traffic (e.g., using physical downlink control channel (PDCCH), enhanced physical downlink control channel (ePDCCH), ACK/NACK, etc.) for both the LTE RAT and non-LTE RAT. In this regard, the downlink transmission time interval (TTI) of the non-LTE RAT can be defined relative to the LTE downlink TTI. For example, the downlink TTI of the non-LTE RAT can be defined to be the same as the LTE downlink TTI (e.g., 1 ms) or as a fraction or portion of the LTE downlink TTI (e.g., using a 500 µs slot of the 1 ms LTE downlink TTI). Similarly, the uplink transmission time interval (TTI) of the non-LTE RAT can be defined relative to the LTE uplink TTI. For example, the uplink TTI of the non-LTE RAT can be defined to be the same as the LTE uplink TTI (e.g., 1 ms) or as a fraction or portion of the LTE uplink TTI (e.g., using a 500 μs slot of the 1 ms LTE uplink TTI).

The processing time (e.g., HARQ latency) associated with the multiple RATs can be coordinated to allow the single RAT to perform the control signaling, scheduling, ACK/NACK, etc. for the multiple RATs. In this regard, the processing time for a particular RAT may be lengthened/shortened from its typical and/or available time(s) to facilitate integration into a multi-RAT carrier aggregation approach. For example, in the context of an LTE system where an additional non-LTE RAT has been incorporated into the system and the non-LTE RAT has a processing time lower than the processing time of the LTE RAT (e.g., 8 ms HARQ latency), then processing time of the LTE RAT may be decreased, the processing time of the non-LTE RAT may be increased, and/or a combination thereof to allow one of the RATs (i.e., either the LTE RAT or the non-LTE RAT) to be utilized to perform the control signaling, scheduling, ACK/NACK, etc. for both RATs (i.e., the LTE RAT and the non-LTE RAT).

Accordingly, the techniques of the present disclosure facilitate carrier aggregation across multiple RATs such that as new and/or existing RATs are incorporated into wireless communication systems, increased data throughput can be achieved without relying on dual connectivity approaches that require independent downlink and uplink control and data channels for each RAT. Instead, a single RAT can be utilized for the control signaling, scheduling, ACK/NACK, etc. of multiple RATs by implementing the techniques of the present disclosure.

FIG. 1 illustrates a wireless communication network 100 in accordance with various aspects of the present disclosure. The wireless communication network 100 may include a number of UEs 102, as well as a number of base stations 104. The base stations 104 may include an evolved Node B (eNodeB). A base station may also be referred to as a base transceiver station, a node B, or an access point. A base station 104 may be a station that communicates with the UEs 102 and may also be referred to as a base station, a node B, an access point, and the like.

The base stations 104 communicate with the UEs 102 as indicated by communication signals 106. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104. The base stations 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The wireless communication network 100 is one example of a network to which various aspects of the disclosure apply.

Each base station 104 may provide communication coverage for a particular geographic area. In 3GPP, the term "cell" can refer to this particular geographic coverage area of a base station and/or a base station subsystem serving the coverage area, depending on the context in which the term is used. In this regard, a base station 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. And, a base station for a femto cell may be referred to as a femto base station or a home base station. In the example shown in FIG. 1, the base stations 104a, 104b and 104c are examples of macro base station for the coverage areas 110a, 110b and 110c, respectively. The base stations 104d and 104e are examples of pico and/or femto base stations for the coverage areas 110d and 110e, respectively. An base station 104 may support one or multiple (e.g., two, three, four, and the like) cells.

The wireless network 100 may also include relay stations. A relay station is a station that receives a transmission of data and/or other information from an upstream station (e.g., a base station, a UE, or the like) and sends a transmission of the data and/or other information to a downstream station (e.g., another UE, another base station, or the like). A relay station may also be a UE that relays transmissions for other UEs. A relay station may also be referred to as a relay base station, a relay UE, a relay, and the like.

The wireless network 100 may support synchronous or asynchronous operation. For synchronous operation, the base stations 104 may have similar frame timing, and transmissions from different base stations 104 may be approximately aligned in time. For asynchronous operation, the base stations 104 may have different frame timing, and transmissions from different base stations 104 may not be aligned in time.

In some implementations, the wireless network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
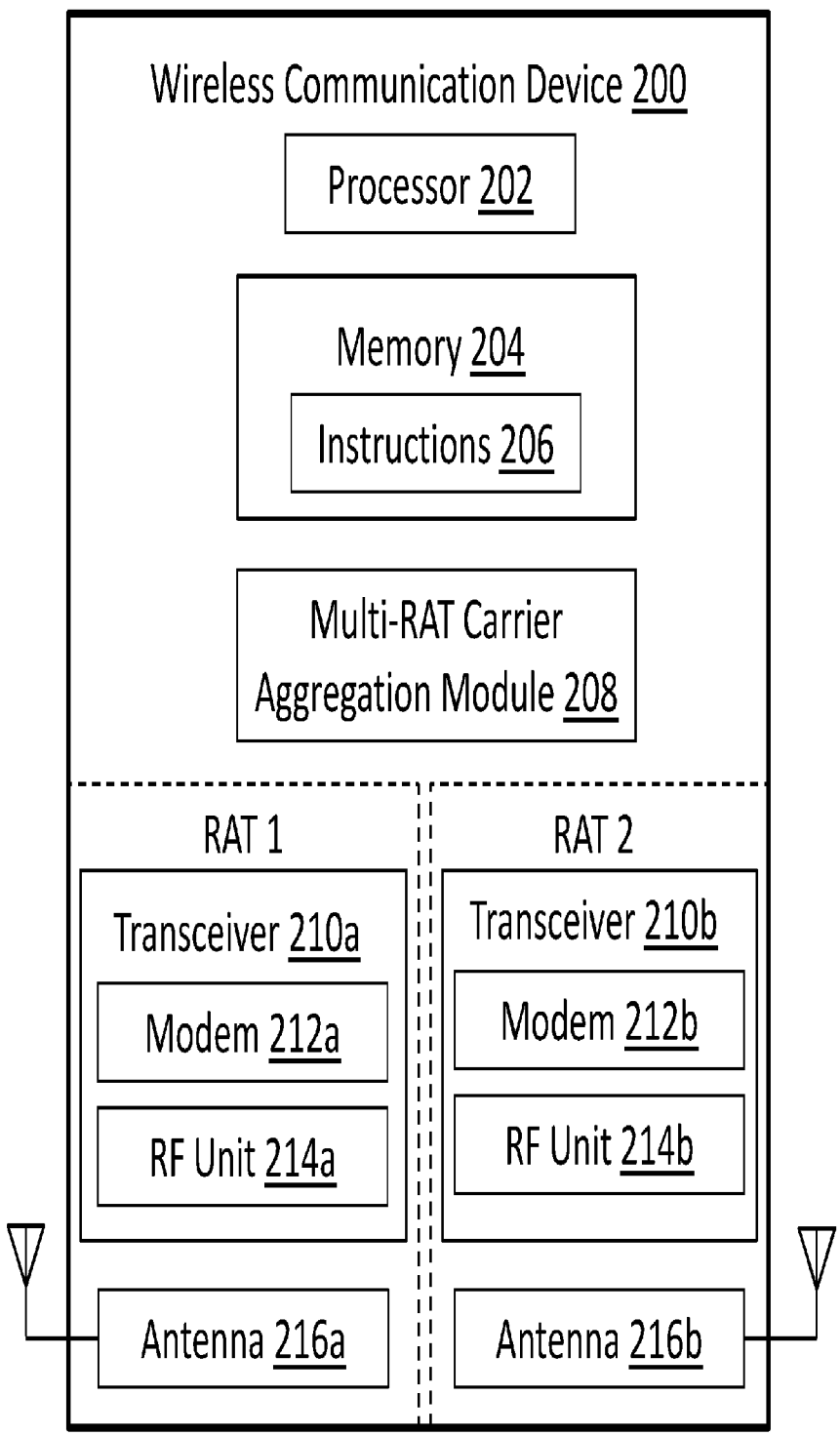
FIG. 2 illustrates a wireless communication device associated with first and second radio access technology components in accordance with various aspects of the present disclosure.

FIG. 2 is a block diagram of an exemplary wireless communication device 200 according to embodiments of the present disclosure. The wireless communication device 200 may be a base station 104, controller, and/or other network device having any one of many configurations. As shown, the wireless communication device 200 may include a processor 202, a memory 204 with instructions 206 stored thereon, a multi-RAT carrier aggregation module 208, a first RAT sub-system that includes a transceiver 210a (including a modem 212a and an RF unit 214a) and an antenna 216a, and a second RAT sub-system that includes a transceiver 210b (including a modem 212b and an RF unit 214b) and an antenna 216b. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to wireless communication devices 200 introduced above with respect to FIG. 1 and discussed in more detail below. In particular, the processor 202 may be utilized in combination with the other components of the wireless communication device 200, including the multi-RAT carrier aggregation module 208, to perform the various functions associated with the multi-RAT carrier aggregation, including coordinating control for multiple RATs utilizing a single RAT, as described in greater detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the wireless communication devices 200 coordinating control for multiple RATs utilizing a single RAT in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The multi-RAT carrier aggregation module 208 may be used for various aspects of the present disclosure. For example, the multi-RAT carrier aggregation module 208 may coordinate the control signaling, scheduling, ACK/NACK, etc. for multiple RATs using communications of a single RAT. For example, the multi-RAT carrier aggregation module 208 can utilize communications over one of the first and second RAT sub-systems of the wireless communication device 200 to schedule and/or acknowledge (or not) traffic (e.g., using physical downlink control channel (PDCCH), enhanced physical downlink control channel (ePDCCH), ACK/NACK, etc.) between a UE 102 and the wireless communication device 200 over both the first and second RAT sub-systems.

In this regard, the multi-RAT carrier aggregation module 308 can use a multi-RAT compatible transmission time interval (TTI) to coordinate the multi-RAT carrier aggregation in some instances. For example, the transmission time intervals (TTIs), downlink and/or uplink, of the first and second RAT sub-systems can be scaled to one another to allow communications over one of the RAT sub-systems to coordinate communications over both RAT sub-systems. For example, the downlink and/or uplink TTIs of the first RAT sub-system can be defined to be the same as, a fraction, and/or a multiple of the corresponding downlink and/or uplink TTIs of the second RAT sub-system. As a result, the downlink and/or uplink communications over both the first and second RAT sub-systems can be coordinated using only one of the RAT sub-systems. In this regard, the multi-RAT carrier aggregation module 208 can be configured to coordinate communications (downlink and/or uplink) over multiple RATs utilizing a single RAT as described in additional detail with respect to FIGS. 4-9 below.

As shown, wireless communication device 200 is associated with first and second RAT sub-systems. In this regard, the first and second RAT sub-systems may be separate components at a common location (e.g., at the same base station) or at different locations (e.g., at two different base stations, at a base station and a gateway, etc.). Where the first and second RAT sub-systems are at different locations, the wireless communication device 200 may be part of a controller or control system that is in communication with each of the RAT sub-systems, either directly or indirectly, including via wired and/or wireless connections. Further, in some implementations the wireless communication device 200 includes (or is in communication with) additional RAT sub-systems such that the wireless communication device 200 includes (or is in communication with) three or more RAT sub-systems.

As shown, each of the RAT sub-systems includes the transceiver 210a, 210b that may include a modem subsystem 212a, 212a and a radio frequency (RF) unit 214a, 214b. The transceiver 210a, 210b can be configured to communicate bi-directionally with other devices, such as UEs 102, base stations 104, and/or other wireless communication devices. The modem subsystem 212a, 212b may be configured to modulate and/or encode the data from the multi-RAT carrier aggregation module 208 according to a modulation and coding scheme (MCS), e.g., a low-density parity check (LDPC) coding scheme, a turbo coding scheme, a convolutional coding scheme, etc. The RF unit 214a, 214b may be configured to process (e.g., perform analog to digital conversion or digital to analog conversion, etc.) modulated/encoded data from the modem subsystem 212a, 212b (on outbound transmissions) or of transmissions originating from another source such as a UE 102, a base station 104, and/or other wireless communication device. Although shown as integrated together in the transceiver 210a, 210b the modem subsystem 212a, 212b and the RF unit 214a, 214b may be separate devices that are coupled together at the wireless communication device 200 to enable the wireless communication device 200 to communicate with other devices via the respective RAT.

The RF unit 214a, 214b may provide the modulated and/or processed data, e.g. data packets (or, more generally, data messages that may contain one or more data packets and other information), to the antenna 216a, 216b for transmission to one or more other devices. This may include, for example, transmission of control and scheduling signals for multiple RATs utilizing a single RAT according to embodiments of the present disclosure. For example, control and scheduling signals for both RAT sub-systems (RAT 1 and RAT 2) of wireless communication device 200 may be coordinated through the first RAT sub-system (RAT 1). The antenna 216a, 216b may further receive data messages transmitted from other devices and provide the received data messages for processing and/or demodulation at the transceiver 210a, 210b. Although FIG. 2 illustrates each antenna 216a, 216b as a single antenna, the antenna 216a, 216b may include multiple antennas of similar or different designs in order to sustain multiple transmission links.

Figure 3:
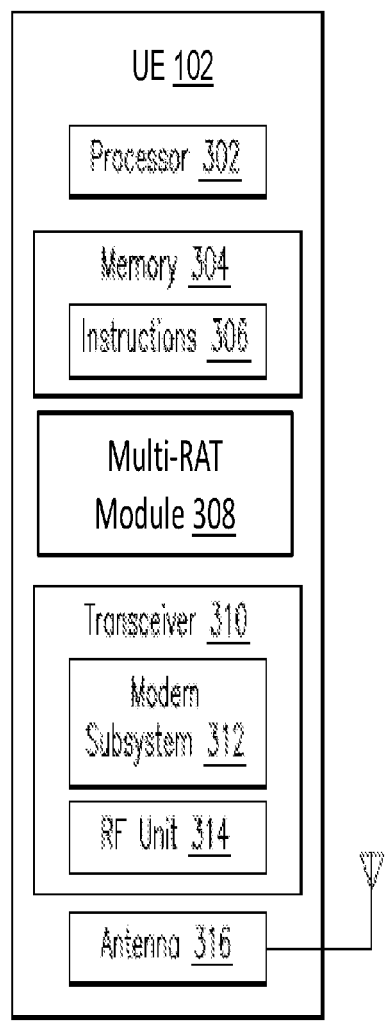
FIG. 3 illustrates a user equipment in accordance with various aspects of the present disclosure.

FIG. 3 is a block diagram of an exemplary UE 102 according to embodiments of the present disclosure. The UE 102 is representative of a wide variety of device types, including any one of many configurations described above. As shown, the UE 102 may include a processor 302, a memory 304 with instructions 306 stored thereon, a multi-RAT module 308, a transceiver 310 (including a modem 312 and an RF unit 314), and an antenna 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to UE 102 introduced above with respect to FIG. 1 and discussed in more detail below. In particular, the processor 302 may be utilized in combination with the other components of the UE 102, including multi-RAT module 308, to perform the various functions associated with the multi-RAT carrier aggregation as described in greater detail below. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UE 102 sending (uplink) and/or receiving (downlink) signals utilizing multiple RATs in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The multi-RAT module 308 may be used for various aspects of the present disclosure. For example, the multi-RAT module 308 may coordinate the control signaling, scheduling, ACK/NACK, etc. for multiple RATs using a single RAT. For example, the multi-RAT module 308 can utilize communications over one RAT sub-system (e.g., RAT 1 of the wireless communication device 200 of FIG. 2) to schedule and/or acknowledge (or not) traffic (e.g., using physical downlink control channel (PDCCH), enhanced physical downlink control channel (ePDCCH), ACK/NACK, etc.) between the UE 102 and other wireless communication device(s) over multiple RAT sub-systems (e.g., RAT 1 and RAT 2 of the wireless communication device 200 of FIG. 2).

In this regard, the multi-RAT module 308 can use a multi-RAT compatible transmission time interval (TTI) to coordinate the multi-RAT carrier aggregation in some instances. For example, the transmission time intervals (TTIs), downlink and/or uplink, of the multiple RATs can be scaled to one another to allow communications over one of the RATs to be utilized to coordinate communications over the other RATs. For example, the downlink and/or uplink TTIs of the first RAT can be defined to be the same as, a fraction, and/or a multiple of the corresponding downlink and/or uplink TTIs of another RAT. As a result, the downlink and/or uplink communications over both RATs can be coordinated using only one of the RAT sub-systems. In this regard, the multi-RAT module 308 can be configured to coordinate communications (downlink and/or uplink) over multiple RATs utilizing control, scheduling, and/or ACK/NACK communications using a single RAT as described in additional detail with respect to FIGS. 4-9 below.

As shown, the transceiver 310 may include the modem subsystem 312 and the radio frequency (RF) unit 314. The transceiver 310 can be configured to communicate bi-directionally with other devices, such as base stations 104 and/or other UEs 102. The modem subsystem 312 may be configured to modulate and/or encode the data from the multi-RAT module 308 according to a modulation and coding scheme (MCS), e.g., a low-density parity check (LDPC) coding scheme, a turbo coding scheme, a convolutional coding scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a base station 104 or another UE 102. Although shown as integrated together in transceiver 310, the modem subsystem 312 and the RF unit 314 may be separate devices that are coupled together at the UE 102 to enable the UE 102 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of control signals, data signals, ACK/NACK signals, etc. to other devices according to embodiments of the present disclosure. The antenna 316 may further receive data, including control signals, data signals, ACK/NACK signals, etc., transmitted from other devices and provide the received data for processing and/or demodulation at the transceiver 310. Although FIG. 3 illustrates antenna 316 as a single antenna, antenna 316 may include multiple antennas of similar or different designs in order to sustain multiple transmission links. For example, in some implementations, the UE 102 includes multiple antennas such that each RAT has a dedicated antenna. Further, in some implementations, a single antenna can be utilized for multiple RATs.

Figure 4:
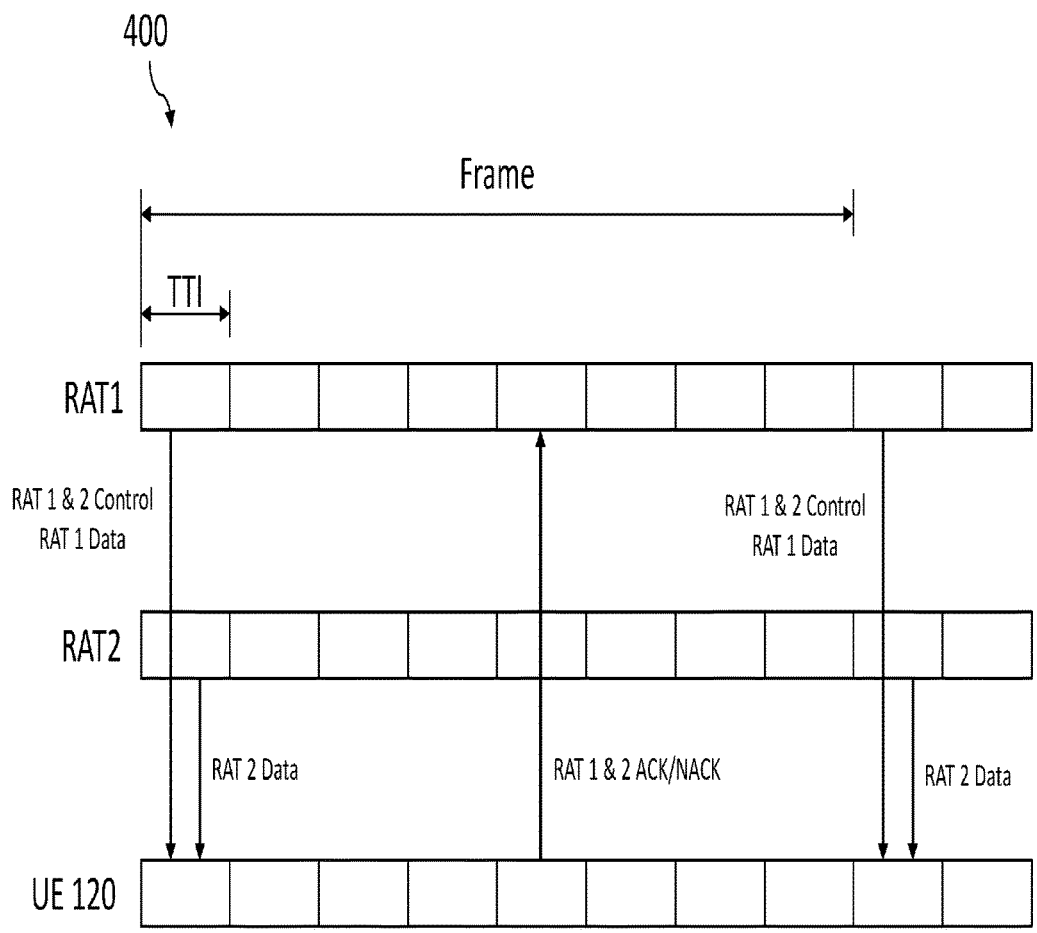
FIG. 4 illustrates a frame format and corresponding communication transmissions between a first radio access technology component, a second radio access technology component, and a user equipment in accordance with various aspects of the present disclosure.
Figure 5:
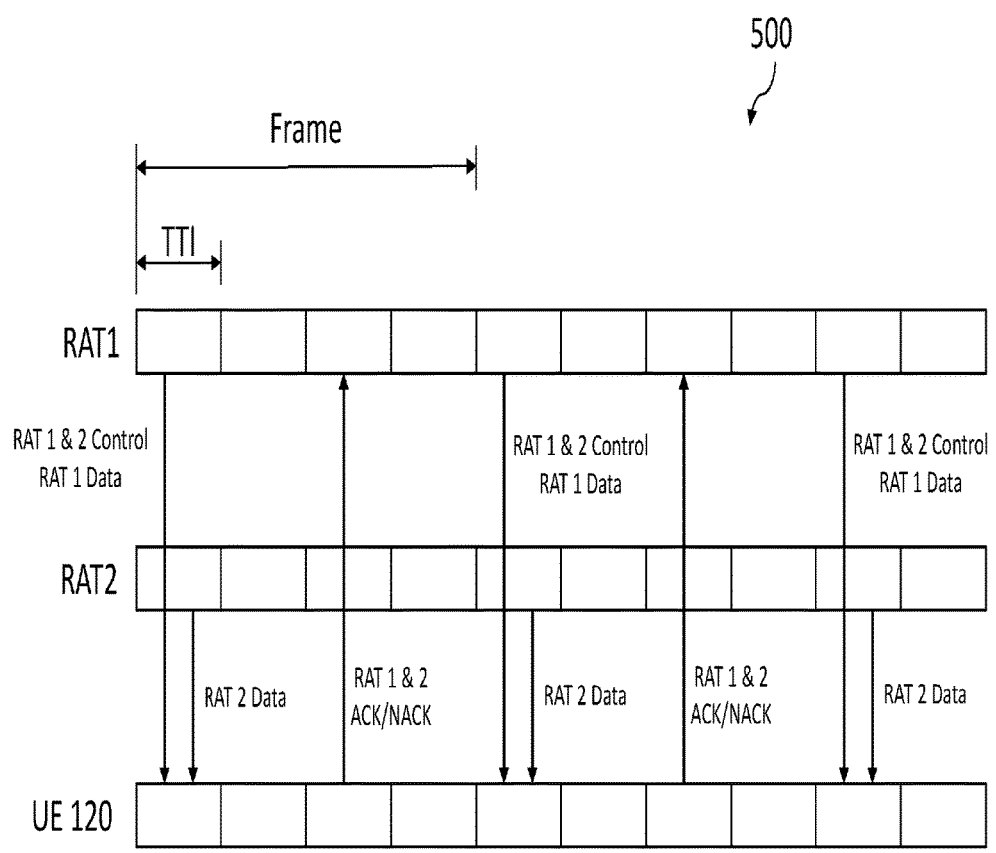
FIG. 5 illustrates a frame format and corresponding communication transmissions between a first radio access technology component, a second radio access technology component, and a user equipment in accordance with various aspects of the present disclosure.
Figure 6:
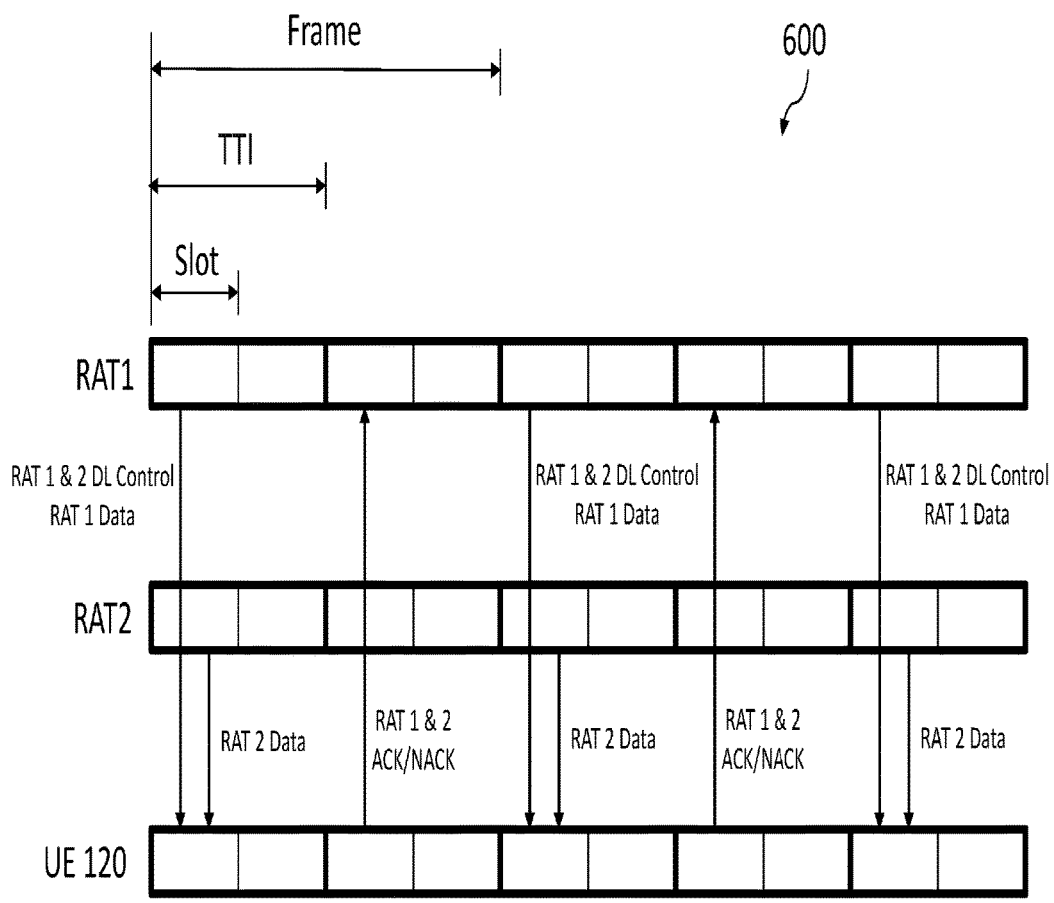
FIG. 6 illustrates a frame format and corresponding communication transmissions between a first radio access technology component, a second radio access technology component, and a user equipment in accordance with various aspects of the present disclosure.

Referring now to FIGS. 4-6, shown therein are various frame format and corresponding communication transmissions between a first radio access technology component, a second radio access technology component, and a user equipment in accordance with various aspects of the present disclosure. In particular, FIGS. 4-6 illustrate various approaches to coordinating transmission time intervals (TTIs) across multiple RATs to facilitate multi-RAT carrier aggregation for downlink transmissions in accordance with the present disclosure.

For example, referring more specifically to FIG. 4, shown therein is a frame and signaling structure 400 according to aspects of the present disclosure. As shown, during a first TTI control information for communications over both RAT 1 and RAT 2 are sent to the UE 120 utilizing RAT 1 only. The control information can include information regarding a channel condition (e.g. channel quality information (CQI)), a downlink band(s), coding scheme(s), scheduling/timing of a data load to be transmitted to the UE 120, a size of a data load to be transmitted to the UE 120, etc. The UE 120 utilizes the received control information to configure itself for the receipt of data over RAT 2 and/or RAT 1. In this regard, data may be transmitted over one or both of RAT 1 and RAT 2. For example, particularly types of data may be more suitable for transmission using a particular RAT. Accordingly, in some instances data may only be transmitted over one of RAT 1 or RAT 2. In other instances, data may be transmitted over both RAT 1 and RAT 2. When data is transmitted over both RAT 1 and RAT 2, the data sent over each RAT may be different data or the same data (e.g., where the data is transmitted over both RATs in an effort to ensure receipt by the UE 120). In the illustrated embodiment, both RAT 1 data and RAT 2 are transmitted to the UE 120. The RAT 1 data transmitted to the UE 120 can be transmitted using a different channel of RAT 1 (e.g., a data channel) than the channel (e.g., a control channel) used to transmit the control information for RAT 1 and RAT 2.

The UE 120 transmits an acknowledgement (ACK) or negative acknowledgement (NACK) using RAT 1 in a subsequent TTI. The ACK/NACK transmitted by the UE 120 can be transmitted using the channel (e.g., a control channel) used to transmit the control information for RAT 1 and RAT 2 to the UE 120, which may be different than the channel of RAT 1 (e.g., a data channel) that the RAT 1 data was transmitted over. The ACK/NACK provides an indication as to whether the UE 120 successfully received the data transmitted over RAT 1 and/or RAT 2. In some instances, a separate ACK/NACK is sent with respect to each of the RAT 1 data and the RAT 2 data, but each ACK/NACK is sent using RAT 1. In other instances, a single ACK/NACK is sent that indicates that the RAT 1 data and/or RAT 2 data was received by the UE 120, or not. The UE 120 does not make a separate ACK/NACK transmission using RAT 2. Rather, the ACK/NACK transmitted by the UE 120 using RAT 1 includes an indication as to whether the RAT 2 data was received or not. In this regard, a base station, controller, control system, and/or other component(s) linking RAT 1 and RAT 2 may communicate the ACK/NACK received via RAT 1 to RAT 2 and/or otherwise instruct RAT 2 based on the received ACK/NACK. For example, where a NACK is received from the UE 120, then the RAT 2 data can be retransmitted to the UE 120 (e.g., using a HARQ or similar approach) via RAT 2. Because RAT 2 does not need to receive the ACK/NACK from the UE 120, the RAT 2 can continue operating in the same operation mode without switching. For example, RAT 2 may continue operating in a downlink mode (e.g., by sending data to other UEs) during the TTI in which the UE 120 sends the ACK/NACK. By eliminating the need for RAT 2 to switch between downlink and uplink modes for control purposes, the overall data throughput of the system can be increased.

The spacing between the TTI in which the control information and data are transmitted to the UE 120, the TTI in which the UE 120 sends the ACK/NACK, and the next TTI in which the control information and data are retransmitted (e.g., if the UE sends a NACK) or new control information and data are transmitted (e.g., if the UE 120 sends an ACK) can vary depending on the particular RATs being utilized, whether the structure needs to be backward compatible (or not), desired/available processing times and/or power, hardware (e.g., base station, UE, etc.) features, and/or other network parameters. In some instances the TTI structure of RAT 2 is scaled to the TTI structure (or slot structure) of RAT 1 to facilitate the multi-RAT carrier aggregation of the present disclosure. In this regard, RAT 1 may be considered a legacy or existing RAT of a wireless network, where RAT 2 is a newly added or introduced RAT to the wireless network. In some particular implementations, RAT 1 may be an LTE RAT and RAT 2 may be a RAT having increased bandwidth and/or throughput relative to the LTE RAT, a RAT having an unlicensed band, and/or a RAT having other features different than the LTE RAT. To this end, in some instances the TTI of RAT 2 is scaled to the 1 ms TTI structures and/or 500 μs slot structures associated with current LTE frame structures to facilitate the multi-RAT carrier aggregation of the present disclosure. Further, the processing time(s) of RAT 2 (e.g., HARQ latency) can be scaled to match corresponding processing times of RAT 1 in a similar manner.

Each of FIGS. 4-6 shows a different frame structure spacing according to aspects of the present disclosure. In each of the FIGS. 4-6, the examples show the timing of the frame structures of the second RATs being aligned to the timing of the frame structures of the first RATs. For example, the frame structure 400 of FIG. 4 illustrates an approach where the ACK/NACK is sent at $TTI_{n+4}$ following receipt of the control information and/or data at $TTI_n$ and the retransmission occurs at $TTI_{n+8}$ in the event that a NACK is sent by the UE 120. The frame structure 500 of FIG. 5 illustrates an approach where the ACK/NACK is sent at $TTI_{n+2}$ following receipt of the control information and/or data at $TTI_n$ and the retransmission occurs at $TTI_{n+4}$ in the event that a NACK is sent by the UE 120. Accordingly, the frame structure 500 of FIG. 5 has a reduced processing time or HARQ latency as compared to FIG. 4. This reduced processing time can be advantageous for increasing throughput of the network. However, such an approach may require changing standards and/or default rules associated with an existing RAT deployment (e.g., RAT 1, an LTE RAT, etc.). The frame structure 600 of FIG. 6 illustrates an approach where the ACK/NACK is sent in a first slot of $TTI_{n+1}$ following receipt of the control information and/or data in a first slot of $TTI_n$ and the retransmission occurs in a first slot at $TTI_{n+2}$ in the event that a NACK is sent by the UE 120. Accordingly, the frame structure 600 of FIG. 6 has a further reduced processing time or HARQ latency as compared to FIGS. 4 and 5. In this regard, instead of relying on the TTI, the coordinated timing of the different RATs can be scheduled using slots of the TTIs. In this regard, each TTI may be divided up into any number of slots, including 2, 3, 4, or more slots. In the illustrated embodiment of FIG. 6, each TTI has been divided into two slots.

Figure 7:
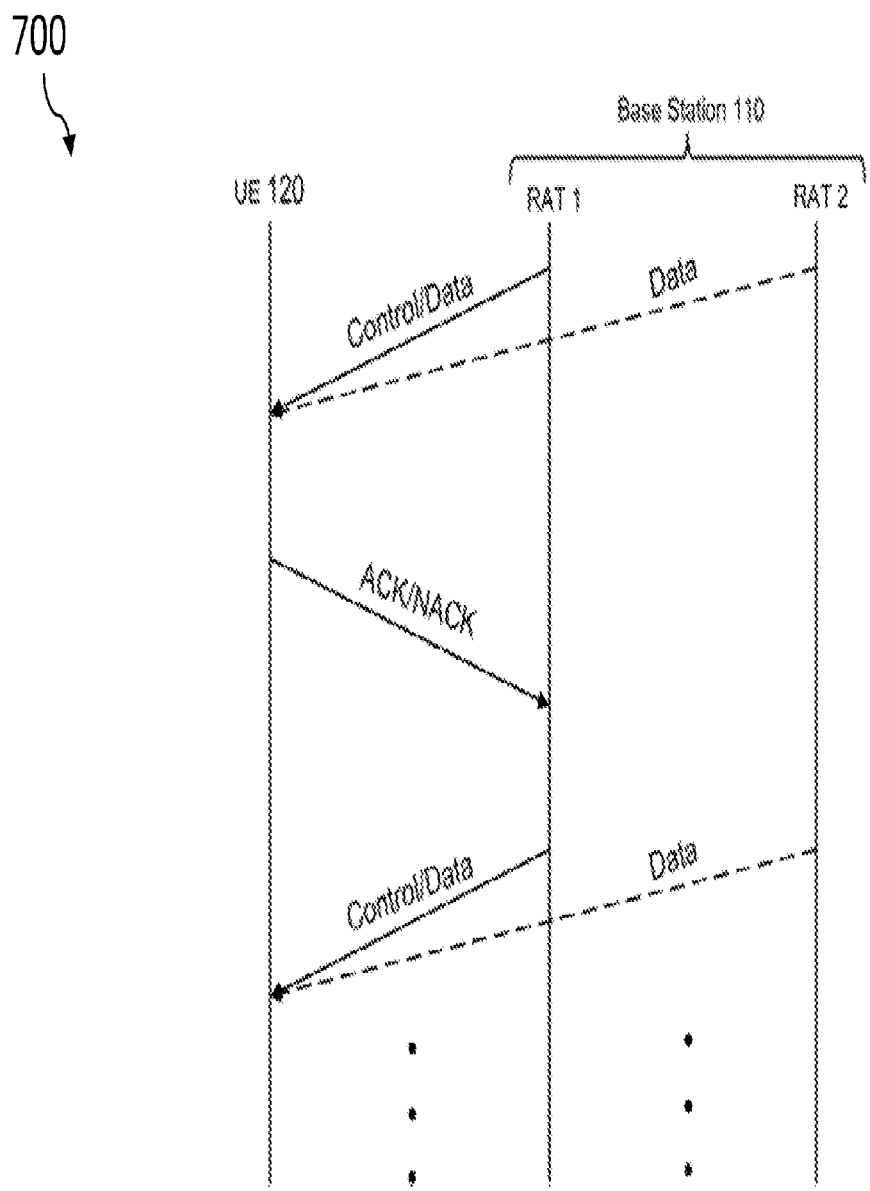
FIG. 7 illustrates a protocol diagram illustrating transmissions between a base station having first and second radio access technology components and a user equipment in accordance with various aspects of the present disclosure.

Referring now to FIG. 7, shown therein is a protocol diagram 700 illustrating transmissions between a base station 110 having first and second radio access technology components and a user equipment 120 in accordance with various aspects of the present disclosure. In particular, FIG. 7 illustrates transmissions consistent with those described above in the context of FIGS. 4-6 for downlink, multi-RAT carrier aggregation. As shown, the base station 110 transmits control information for communications over both RAT 1 and RAT 2 to the UE 120 utilizing RAT 1 only. As discussed above, the control information can include information regarding a channel condition (e.g. channel quality information (CQI)), a downlink band(s), coding scheme(s), scheduling/timing of a data load to be transmitted to the UE 120, a size of a data load to be transmitted to the UE 120, etc. The UE 120 utilizes the received control information to configure itself for the receipt of data over RAT 2 and/or RAT 1. In this regard, data may be transmitted by the base station 110 over one or both of RAT 1 and RAT 2. For example, particularly types of data may be more suitable for transmission using a particular RAT. Accordingly, in some instances the base station 110 may select a particular RAT (RAT 1 or RAT 2 ) to transmit data over. In other instances, the base station 110 may transmit data over both RAT 1 and RAT 2. The base station 110 can transmit the RAT 1 data to the UE 120 using a different channel of RAT 1 (e.g., a data channel) than the channel (e.g., a control channel) used to transmit the control information for RAT 1 and RAT 2.

As shown, the UE 120 subsequently transmits an acknowledgement (ACK) or negative acknowledgement (NACK) using RAT 1. The UE 120 can transmit the ACK/NACK using the channel (e.g., a control channel) used by the base station 110 to transmit the control information for RAT 1 and RAT 2 to the UE 120, which may be different than the channel of RAT 1 (e.g., a data channel) that the RAT 1 data was received over. The ACK/NACK provides an indication as to whether the UE 120 successfully received the data transmitted over RAT 1 and/or RAT 2. In some instances, the UE 120 sends a separate ACK/NACK for each of the RAT 1 data and the RAT 2 data, but each ACK/NACK is sent using RAT 1. In other instances, the UE 120 sends a single ACK/NACK that indicates whether the RAT 1 data and/or RAT 2 data was received by the UE 120, or not. The UE 120 does not make a separate ACK/NACK transmission using RAT 2. Rather, the ACK/NACK transmitted by the UE 120 using RAT 1 includes an indication as to whether the RAT 2 data was received or not. In this regard, a base station 110 (or a controller, control system, and/or other component (s) linking RAT 1 and RAT 2 of the base station 110) may communicate the ACK/NACK received via RAT 1 to RAT 2 and/or otherwise instruct RAT 2 based on the received ACK/NACK from UE 120. As shown, this process repeats to facilitate continued communication between the base station 110 and the UE 120 using a multi-RAT carrier aggregation scheme.

Figure 8:
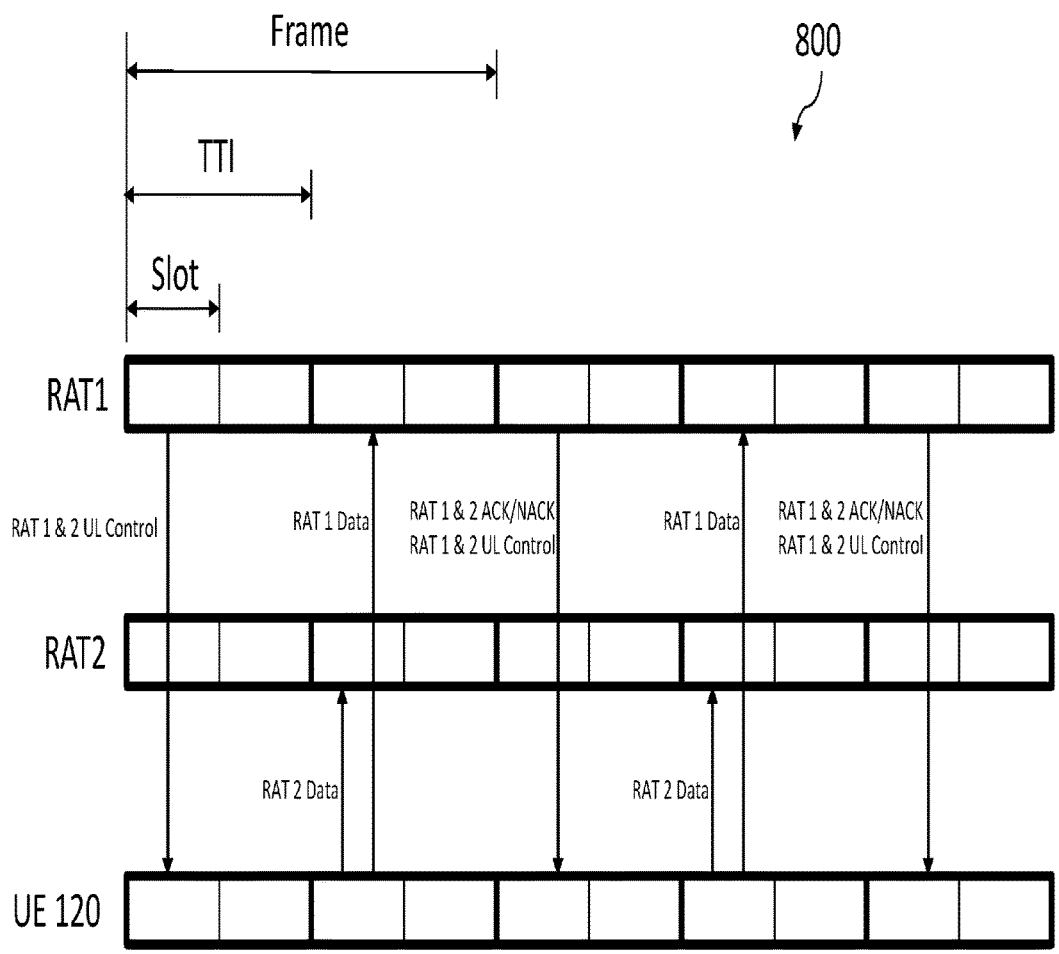
FIG. 8 illustrates a frame format and corresponding communication transmissions between a first radio access technology component, a second radio access technology component, and a user equipment in accordance with various aspects of the present disclosure.

Referring now to FIG. 8, shown therein is an exemplary frame format 800 and corresponding communication transmissions between a first radio access technology component, a second radio access technology component, and a user equipment in accordance with various aspects of the present disclosure. In particular, FIG. 8 illustrates an approach to coordinating transmission time intervals (TTIs) across multiple RATs to facilitate multi-RAT carrier aggregation for uplink transmissions in accordance with the present disclosure.

As shown in FIG. 8, during a first TTI control information for uplink communications over both RAT 1 and RAT 2 are sent to the UE 120 utilizing RAT 1 only. The control information can include information regarding a channel condition (e g channel quality information (CQI)), a downlink band(s), coding scheme(s), scheduling/timing of a data uplink, etc. The UE 120 utilizes the received control information to configure itself for the transmission of data over RAT 2 and/or RAT 1 in a subsequent TTI in the illustrated embodiment. In this regard, the UE 120 may transmit data over one or both of RAT 1 and RAT 2. For example, particularly types of data may be more suitable for transmission using a particular RAT. Accordingly, in some instances the UE 120 may only transmit data over one of RAT 1 or RAT 2. In other instances, data may be transmitted over both RAT 1 and RAT 2. When data is transmitted over both RAT 1 and RAT 2, the data sent over each RAT may be different data or the same data (e.g., where the data is transmitted over both RATs by the UE 120 in an effort to ensure receipt). In the illustrated embodiment, both RAT 1 data and RAT 2 are transmitted by the UE 120. The RAT 1 data transmitted by the UE 120 can be transmitted using a different channel of RAT 1 (e.g., a data channel) than the channel (e.g., a control channel) used to transmit the control information for RAT 1 and RAT 2 to the UE 120.

RAT 1 transmits an acknowledgement (ACK) or negative acknowledgement (NACK) using RAT 1 in a subsequent TTI. The ACK/NACK transmitted by RAT 1 can be transmitted using the channel (e.g., a control channel) used to transmit the initial uplink control information for RAT 1 and RAT 2 to the UE 120, which may be different than the channel of RAT 1 (e.g., a data channel) that the RAT 1 data was transmitted over by the UE 120. The ACK/NACK provides an indication as to whether the RAT 1 (or associated wireless communication device) successfully received the data transmitted over RAT 1 and/or RAT 2. In some instances, a separate ACK/NACK is sent with respect to each of the RAT 1 data and the RAT 2 data, but each ACK/NACK is sent using RAT 1. In other instances, a single ACK/NACK is sent that indicates that the RAT 1 data and/or RAT 2 data was received, or not. A separate ACK/NACK transmission is not made using RAT 2. Rather, the ACK/NACK transmitted using RAT 1 includes an indication as to whether the RAT 2 data was received or not. Along with the ACK/NACK, or in a separate TTI (or slot), the RAT 1 can also transmit control information for uplink communications over both RAT 1 and RAT 2, which may be the same or updated as the initially transmitted control information. In the illustrated embodiment, the ACK/NACK and updated control information are sent in the same slot of a common TTI. Accordingly, if a NACK is received by the UE 120, then the UE 120 can attempt to retransmit the data based on the updated control information received along with the NACK.

Similar to the downlink multi-RAT carrier aggregation techniques described above, the spacing between the TTI (or slot) in which the control information and data are transmitted to the UE 120, the TTI (or slot) in which the UE 120 sends data via RAT 1 and/or RAT 2, the TTI (or slot) in which the ACK/NACK is sent, the TTI (or slot) in which the updated uplink control information is sent, and/or the TTI (or slot) in which the uplink data is retransmitted (e.g., if the UE sends a NACK) or new uplink data is transmitted (e.g., if the UE 120 sends an ACK) can vary depending on the particular RATs being utilized, whether the structure needs to be backward compatible (or not), desired/available processing times and/or power, hardware (e.g., base station, UE, etc.) features, and/or other network parameters. FIG. 8 illustrates a slot-based approach similar to FIG. 6, but it is understood that various other approaches may be utilized, including approaches similar to those described above with respect to FIGS. 4 and 5, for uplink multi-RAT carrier aggregation techniques in accordance with the present disclosure.

Figure 9:
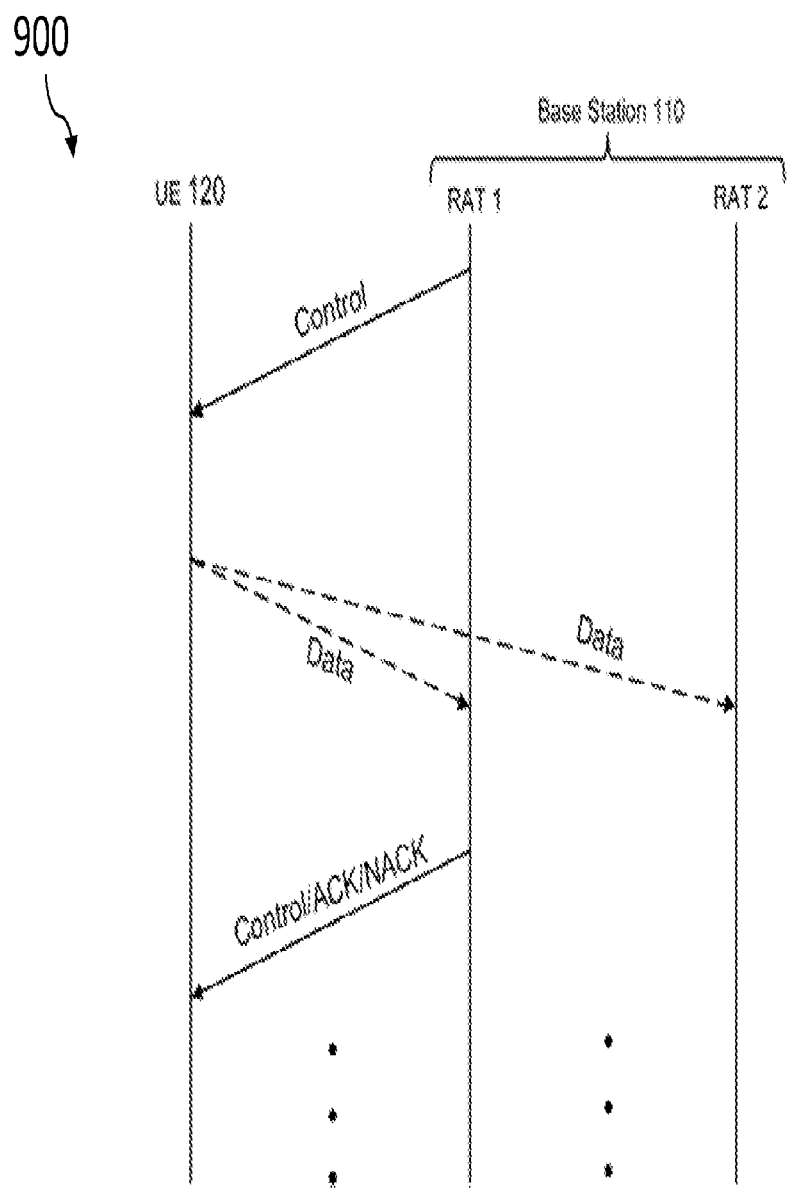
FIG. 9 illustrates a protocol diagram illustrating transmissions between a base station having first and second radio access technology components and a user equipment in accordance with various aspects of the present disclosure.

Referring now to FIG. 9, shown therein is a protocol diagram 900 illustrating transmissions between a base station 110 having first and second radio access technology components and a user equipment 120 in accordance with various aspects of the present disclosure. In particular, FIG. 9 illustrates transmissions consistent with those described above in the context of FIG. 8 for uplink, multi-RAT carrier aggregation. As shown, the base station 110 transmits control information for communications over both RAT 1 and RAT 2 to the UE 120 utilizing RAT 1 only. As discussed above, the control information can include information regarding a channel condition (e.g. channel quality information (CQI)), a downlink band(s), coding scheme(s), scheduling/timing of uplink data, etc. The UE 120 utilizes the received control information to configure itself for the transmission of data over RAT 2 and/or RAT 1. In this regard, uplink data may be transmitted by the UE 120 over one or both of RAT 1 and RAT 2. For example, particularly types of data may be more suitable for transmission using a particular RAT. Accordingly, in some instances the UE 120 may select a particular RAT (RAT 1 or RAT 2) to transmit data over. In other instances, the UE 120 may transmit data over both RAT 1 and RAT 2. The UE 120 can transmit the RAT 1 data to the base station 110 using a different channel of RAT 1 (e.g., a data channel) than the channel (e.g., a control channel) used to transmit the control information for RAT 1 and RAT 2 to the UE 120.

As shown, the base station 120 subsequently transmits, using RAT 1, an acknowledgement (ACK) or negative acknowledgement (NACK) and updated control information. The base station 110 can transmit the ACK/NACK using the channel (e.g., a control channel) used to transmit the initial control information for RAT 1 and RAT 2 to the UE 120, which may be different than the channel of RAT 1 (e.g., a data channel) that the RAT 1 data was transmitted over by UE 120. The ACK/NACK provides an indication as to whether the base station 110 successfully received the data transmitted over RAT 1 and/or RAT 2. In some instances, the base station 110 sends a separate ACK/NACK for each of the RAT 1 data and the RAT 2 data, but each ACK/NACK is sent using RAT 1. In other instances, the base station 110 sends a single ACK/NACK that indicates whether the RAT 1 data and/or RAT 2 data was received by the base station 110, or not. The base station 110 does not make a separate ACK/NACK transmission using RAT 2. Rather, the ACK/NACK transmitted by the base station 110 using RAT 1 includes an indication as to whether the RAT 2 data was received or not. As shown, this process repeats to facilitate continued communication between the base station 110 and the UE 120 using a multi-RAT carrier aggregation scheme. In this regard, it is understood that the base station 110 and the UE 120 may periodically, randomly, or based on demand alternate between the uplink multi-RAT carrier aggregation approach illustrated in FIG. 9, the downlink multi-RAT carrier aggregation approach illustrated in FIG. 7, and/or standard uplink and downlink communication approaches.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a computer-readable medium having program code recorded thereon, the program code comprising code for causing a computer, at a first wireless communication device, to transmit control information to a second wireless communication device via a first radio access technology (RAT), the control information including control information for a second RAT. The program code further comprises code for causing the computer to receive an acknowledgement (ACK) or negative acknowledgement (NACK) from the second wireless communication device via the first RAT, the ACK or NACK being related to communications of the second wireless communication device conducted via the second RAT.

The computer-readable medium further includes wherein the control information further includes control information for the first RAT. The computer-readable medium further includes code for causing the computer to transmit first data to the second wireless communication device via the first RAT. The computer-readable medium further includes code for causing the computer to transmit second data to the second wireless communication device via the second RAT. The computer-readable medium further includes code for causing the computer to retransmit the second data to the second wireless communication device via the second RAT if the NACK is received from the second wireless communication device via the first RAT. The computer-readable medium further includes wherein the first RAT includes a long term evolution (LTE) RAT. The computer-readable medium further includes wherein the code for causing the computer to transmit the control information causes the control information to be transmitted to the second wireless communication device via the LTE RAT during a first transmission time interval (TTI), the code for causing the computer to transmit the second data causes the second data to be transmitted to the second wireless communication device via the second RAT during the first TTI, and the code for causing the computer to receive the ACK or the NACK causes the ACK or the NACK to be received from the second wireless communication device during a second TTI. The computer-readable medium further includes wherein the first wireless communication device is a base station and the second wireless communication device is a user equipment. The computer-readable medium further includes wherein the first wireless communication device includes an antenna associated with the second RAT. The computer-readable medium further includes wherein the first wireless communication device is in communication with an antenna associated with the second RAT positioned remote from the first wireless communication device.

Embodiments of the present disclosure further include a computer-readable medium having program code recorded thereon, the program code comprising code for causing a computer, at a first wireless communication device, to receive control information from a second wireless communication device via a first radio access technology (RAT), the control information including control information for a second RAT. The computer-readable medium further includes code for causing the computer to transmit first data to the second wireless communication device via the second RAT.

The computer-readable medium further includes code for causing the computer to receive an acknowledgement (ACK) or negative acknowledgement (NACK) from the second wireless communication device via the first RAT, the ACK or NACK indicating whether the first data was received by the second wireless communication device via the second RAT. The computer-readable medium further includes code for causing the computer to retransmit the first data to the second wireless communication device via the second RAT if the NACK is received from the second wireless communication device via the first RAT. The computer-readable medium further includes wherein the control information further includes control information for the first RAT. The computer-readable medium further includes code for causing the computer to transmit second data to the second wireless communication device via the first RAT. The computer-readable medium further includes wherein the first RAT includes a long term evolution (LTE) RAT. The computer-readable medium further includes wherein the code for causing the computer to receive the control information causes the control information to be received at the first wireless communication device via the LTE RAT during a first transmission time interval (TTI), and the code for causing the computer to transmit the first data causes the first data to be transmitted to the second wireless communication device via the second RAT during a second TTI. The computer-readable medium further includes wherein the first wireless communication device is a user equipment and the second wireless communication device is a base station. The computer-readable medium further includes wherein the code for causing the computer to transmit the first data to the second wireless communication device via the second RAT causes the first data to be transmitted to an antenna of the second wireless communication device associated with the second RAT. The computer-readable medium further includes wherein the code for causing the computer to transmit the first data to the second wireless communication device via the second RAT causes the first data to be transmitted to an antenna associated with the second RAT positioned remote from the second wireless communication device.

Embodiments of the present disclosure further include a wireless communications device comprising means for transmitting control information to a second wireless communication device via a first radio access technology (RAT), the control information including control information for a second RAT. The wireless communications device further comprises means for receiving an acknowledgement (ACK) or negative acknowledgement (NACK) from the second wireless communication device via the first RAT, the ACK or NACK being related to communications of the second wireless communication device conducted via the second RAT.

The wireless communications device further includes wherein the control information further includes control information for the first RAT. The wireless communications device further includes means for transmitting first data to the second wireless communication device via the first RAT. The wireless communications device further includes means for transmitting second data to the second wireless communication device via the second RAT. The wireless communications device further includes means for retransmitting the second data to the second wireless communication device via the second RAT if the NACK is received from the second wireless communication device via the first RAT. The wireless communications device further includes wherein the first RAT includes a long term evolution (LTE) RAT. The wireless communications device further includes wherein the means for transmitting the control information is configured to transmit the control information to the second wireless communication device via the LTE RAT during a first transmission time interval (TTI), the means for transmitting the second data is configured to transmit the second data to the second wireless communication device via the second RAT during the first TTI, and the means for receiving the ACK or the NACK is configured to receive the ACK or the NACK from the second wireless communication device during a second TTI. The wireless communications device further includes wherein the wireless communication device is a base station and the second wireless communication device is a user equipment. The wireless communications device further includes an antenna associated with the second RAT. The wireless communications device further includes wherein the wireless communication device is in communication with an antenna associated with the second RAT positioned remote from the wireless communication device.

Embodiments of the present disclosure further include a wireless communications device comprising means for receiving control information from a second wireless communication device via a first radio access technology (RAT), the control information including control information for a second RAT. The wireless communications device further comprises means for transmitting first data to the second wireless communication device via the second RAT.

The wireless communications device further includes means for receiving an acknowledgement (ACK) or negative acknowledgement (NACK) from the second wireless communication device via the first RAT, the ACK or NACK indicating whether the first data was received by the second wireless communication device via the second RAT. The wireless communications device further includes means for retransmitting the first data to the second wireless communication device via the second RAT if the NACK is received from the second wireless communication device via the first RAT. The wireless communications device further includes wherein the control information further includes control information for the first RAT. The wireless communications device further includes means for transmitting second data to the second wireless communication device via the first RAT. The wireless communications device further includes wherein the first RAT includes a long term evolution (LTE) RAT. The wireless communications device further includes wherein the means for receiving the control information is configured to receive the control information via the LTE RAT during a first transmission time interval (TTI), and the means for transmitting the first data is configured to transmit the first data via the second RAT during a second TTI. The wireless communications device further includes wherein the wireless communication device is a user equipment and the second wireless communication device is a base station. The wireless communications device further includes wherein the means for transmitting the first data to the second wireless communication device via the second RAT is configured to transmit the first data to an antenna of the second wireless communication device associated with the second RAT. The wireless communications device further includes wherein the means for transmitting the first data to the second wireless communication device via the second RAT is configured to an antenna associated with the second RAT positioned remote from the second wireless communication device.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a first wireless communication device, control information to a second wireless communication device via a first radio access technology (RAT), the control information including control information for the first RAT and a second RAT, a timing structure of the second RAT being aligned to a timing structure of the first RAT;
   receiving, by the first wireless communication device, first data from the second wireless communication device via the first RAT during a first transmission time interval (TTI) of the first RAT;
   receiving, by the first wireless communication device, second data from the second wireless communication device via the second RAT during the first TTI;
   transmitting, by the first wireless communication device, a first acknowledgement (ACK) or negative acknowledgement (NACK) to the second wireless communication device via the first RAT during a second TTI of the first RAT, the first ACK or NACK being related to the first data transmitted via the first RAT during the first TTI; and
   transmitting, by the first wireless communication device, a second ACK or NACK to the second wireless communication device via the first RAT during the second TTI of the first RAT, the second ACK or NACK being related to the second data transmitted via the second RAT during the first TTI.

2. The method of claim 1, further comprising:
   receiving, using the first wireless communication device, the second data from the second wireless communication device via the second RAT if the second NACK is transmitted to the second wireless communication device via the first RAT.

3. The method of claim 1, wherein the first RAT includes a long term evolution (LTE) RAT.

4. The method of claim 3, wherein:
   the control information is transmitted to the second wireless communication device via the LTE RAT during the first TTI;
   and
   the second ACK or the NACK is transmitted to the second wireless communication device during the second TTI according to the timing structure of the first RAT.

5. The method of claim 1, wherein the first wireless communication device is a base station and the second wireless communication device is a user equipment and the communications of the user equipment conducted via the second RAT include receiving uplink data from the user equipment.

6. The method of claim 1, wherein the first wireless communication device includes an antenna associated with the second RAT.

7. The method of claim 1, wherein the first wireless communication device is in communication with an antenna associated with the second RAT positioned remote from the first wireless communication device.

8. A method of wireless communication, comprising:
   receiving, by a first wireless communication device, control information from a second wireless communication device via a first radio access technology (RAT), the control information including control information for the first RAT and a second RAT, a timing structure of the second RAT being aligned to a timing structure of the first RAT;
   receiving, by the first wireless communication device, first data from the second wireless communication device via the first RAT during a first transmission time interval (TTI) of the first RAT;
   receiving, by the first wireless communication device, second data from the second wireless communication device via the second RAT during the first TTI;
   transmitting, by the first wireless communication device, a first acknowledgement (ACK) or negative acknowledgement (NACK) to the second wireless communication device via the first RAT during a second TTI of the first RAT, the first ACK or NACK indicating whether the first data was received by the second wireless communication device via the first RAT during the first TTI; and
   transmitting, by the first wireless communication device, a second ACK or NACK to the second wireless communication device via the first RAT during the second TTI of the first RAT, the second ACK or NACK indicating whether the second data was received by the second wireless communication device via the second RAT during the first TTI.

9. The method of claim 8, further comprising:
receiving, by the first wireless communication device, the second data from the second wireless communication device via the second RAT if the second NACK is transmitted to the second wireless communication device via the first RAT.

10. The method of claim 8, wherein:
the first RAT includes a long term evolution (LTE) RAT,
the control information is received by the first wireless communication device via the LTE RAT during the first TTI, and
the second data is received from the second wireless communication device via the second RAT during the first TTI according to the timing structure of the first RAT.

11. The method of claim 8, wherein the first wireless communication device is a user equipment and the second wireless communication device is a base station, and wherein the receiving the second data via the second RAT includes receiving downlink data from the base station.

12. The method of claim 8, wherein the receiving the second data from the second wireless communication device via the second RAT includes receiving the second data from an antenna of the second wireless communication device associated with the second RAT.

13. The method of claim 8, wherein the receiving the second data from the second wireless communication device via the second RAT includes receiving the second data from an antenna associated with the second RAT positioned remote from the second wireless communication device.

14. A wireless communication device, comprising:
a multiple radio access technology (multi-RAT) module configured to generate control information;
a transmitter in communication with the multi-RAT module and configured to:
transmit the generated control information to a second wireless communication device via a first radio access technology (RAT), the transmitted control information including control information for the first RAT and a second RAT, a timing structure of the second RAT being aligned to a timing structure of the first RAT; and at least one receiver in communication with the multi-RAT module and configured to:
receive first data from the second wireless communication device via the first RAT during a first transmission time interval (TTI) of the first RAT; and
receive second data from the second wireless communication device via the second RAT during the first TTI,
wherein the transmitter is further configured to:
transmit a first acknowledgement (ACK) or negative acknowledgement (NACK) to the second wireless communication device via the first RAT during a second TTI of the first RAT, the first ACK or NACK being related to the first data transmitted via the first RAT during the first TTI; and
transmit a second ACK or NACK to the second wireless communication device via the first RAT during the second TTI of the first RAT, the second ACK or NACK being related to the second data transmitted via the second RAT during the first TTI.

15. The device of claim 14, wherein the at least one receiver is further configured to receive the second data from the second wireless communication device via the second RAT if the transmitter transmits the second NACK from the second wireless communication device via the first RAT.

16. The device of claim 14, wherein:
the first RAT includes a long term evolution (LTE) RAT,
the transmitter is configured to transmit the control information to the second wireless communication device via the LTE RAT during the first TTI, and
the transmitter is configured to transmit the second ACK or the NACK to the second wireless communication device during the second TTI according to the timing structure of the first RAT.

17. The device of claim 14, wherein the wireless communication device is a base station and the second wireless communication device is a user equipment.

18. The device of claim 14, further comprising an antenna associated with the second RAT.

19. The device of claim 14, wherein the multi-RAT module is in communication with an antenna associated with the second RAT positioned remote from the wireless communication device.

20. The device of claim 14, wherein the at least one receiver includes:
a first receiver configured to receive the first data from the second wireless communication device via the first RAT during the first TTI of the first RAT; and
a second receiver configured to receive the second data from the second wireless communication device via the second RAT during the first TTI.

21. A wireless communication device, comprising:
at least one receiver configured to:
receive control information from a second wireless communication device via a first radio access technology (RAT), the control information including control information for the first RAT and a second RAT, a timing structure of the second RAT being aligned to a timing structure of the first RAT;
receive first data from the second wireless communication device via the first RAT during a first transmission time interval (TTI) of the first RAT; and
receive second data from the second wireless communication device via the second RAT during the first TTI; and
a transmitter configured to:
transmit a first acknowledgement (ACK) or negative acknowledgement (NACK) to the second wireless communication device via the first RAT during a second TTI of the first RAT, the first ACK or NACK indicating whether the first data was received by the second wireless communication device via the first RAT during the first TTI; and
transmit a second ACK or NACK to the second wireless communication device via the first RAT during the second TTI of the first RAT, the second ACK or NACK indicating whether the second data was received by the second wireless communication device via the second RAT during the first TTI.

22. The device of claim 21, wherein the at least one receiver is further configured to receive the second data from the second wireless communication device via the second RAT if the second NACK is transmitted to the second wireless communication device via the first RAT.

23. The device of claim 21, wherein the wireless communication device is a user equipment and the second wireless communication device is a base station.

24. The device of claim 21, wherein:
the first RAT includes a long term evolution (LTE) RAT,
the receiver is configured to:
- receive the control information via the LTE RAT during the first TTI, and
- receive the second data from the second wireless communication device via the second RAT during the first TTI according to the timing structure of the first RAT.

25. The device of claim 21, wherein the at least one receiver is configured to receive the second data from an antenna of the second wireless communication device associated with the second RAT.

26. The device of claim 21, wherein the at least one receiver is configured to receive the second data from an antenna associated with the second RAT positioned remote from the second wireless communication device.

27. The device of claim 21, wherein the at least one receiver includes:
- a first receiver configured to receive the first data from the second wireless communication device via the first RAT during the first TTI of the first RAT; and
- a second receiver configured to receive the second data from the second wireless communication device via the second RAT during the first TTI.

* * * * *